United States Patent
Sung et al.

(10) Patent No.: US 10,396,569 B2
(45) Date of Patent: Aug. 27, 2019

(54) BATTERY CELL BALANCING SYSTEM AND METHOD USING LC RESONANCE

(71) Applicant: LG CHEM, LTD., Seoul (KR)

(72) Inventors: Chang Hyun Sung, Daejeon (KR); Sang Hoon Lee, Daejeon (KR); Ho Byung Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 229 days.

(21) Appl. No.: 15/104,613

(22) PCT Filed: Sep. 17, 2015

(86) PCT No.: PCT/KR2015/009778
§ 371 (c)(1),
(2) Date: May 10, 2017

(87) PCT Pub. No.: WO2016/056768
PCT Pub. Date: Apr. 14, 2016

(65) Prior Publication Data
US 2017/0244257 A1    Aug. 24, 2017

(30) Foreign Application Priority Data
Oct. 8, 2014 (KR) .................. 10-2014-0135548

(51) Int. Cl.
*H01M 10/44* (2006.01)
*H01M 10/46* (2006.01)
(Continued)

(52) U.S. Cl.
CPC ............. *H02J 7/0014* (2013.01); *H02J 7/00* (2013.01); *H02J 7/0016* (2013.01);
(Continued)

(58) Field of Classification Search
CPC ...... H02J 7/1423; H02J 7/0013; H02J 7/0014; H02J 7/0018
(Continued)

(56) References Cited

U.S. PATENT DOCUMENTS

2008/0185994 A1    8/2008    Altemose
2014/0062383 A1    3/2014    Yun et al.
(Continued)

FOREIGN PATENT DOCUMENTS

DE    10 2009 000 055 A1    7/2010
JP    11-98698 A    4/1999
(Continued)

OTHER PUBLICATIONS

International Search Report, issued in PCT/KR2015/009778, dated Jan. 12, 2016.
(Continued)

*Primary Examiner* — Edward Tso
(74) *Attorney, Agent, or Firm* — Birch, Stewart, Kolasch & Birch, LLP

(57) ABSTRACT

The present invention relates to a battery cell balancing system and method using LC resonance. The present invention comprises: a drive unit including one or more battery cells connected in series, a resonance module for performing a resonant operation, and a switch unit provided so as to allow electric charges stored in the resonance module to be transferred to each of the one or more battery cells; and a control unit for measuring a resonance period of the resonance module according to a voltage state of each of the one or more battery cells, and transferring the electric charges charged in the resonance module to each of the one or more battery cells by controlling an on/off operation of the switch unit according to the measured resonance period.

20 Claims, 21 Drawing Sheets

(51) Int. Cl.
*H02J 7/00* (2006.01)
*H01M 10/48* (2006.01)
*H01M 10/42* (2006.01)

(52) U.S. Cl.
CPC ......... *H02J 7/0021* (2013.01); *H01M 10/482* (2013.01); *H01M 2010/4271* (2013.01); *Y02T 10/7055* (2013.01)

(58) Field of Classification Search
USPC ......................................... 320/116, 118, 119
See application file for complete search history.

(56) References Cited

U.S. PATENT DOCUMENTS

2015/0340886 A1    11/2015  Sung et al.
2016/0064964 A1*  3/2016  Knoedgen ............. H02J 7/0018
                                                                     320/116
2017/0033700 A1*  2/2017  Ishigaki ................ H02J 7/0016

FOREIGN PATENT DOCUMENTS

JP          2013-13291 A    1/2013
KR    10-2014-0029876 A    3/2014
KR    10-2014-0093404 A    7/2014

OTHER PUBLICATIONS

Written Opinion of the International Searching Authority, issued in PCT/KR2015/009778, dated Jan. 12, 2016.
European Search Report for Appl. No. 15849050.8 dated Aug. 30, 2017.

* cited by examiner

[Figure 1]
100
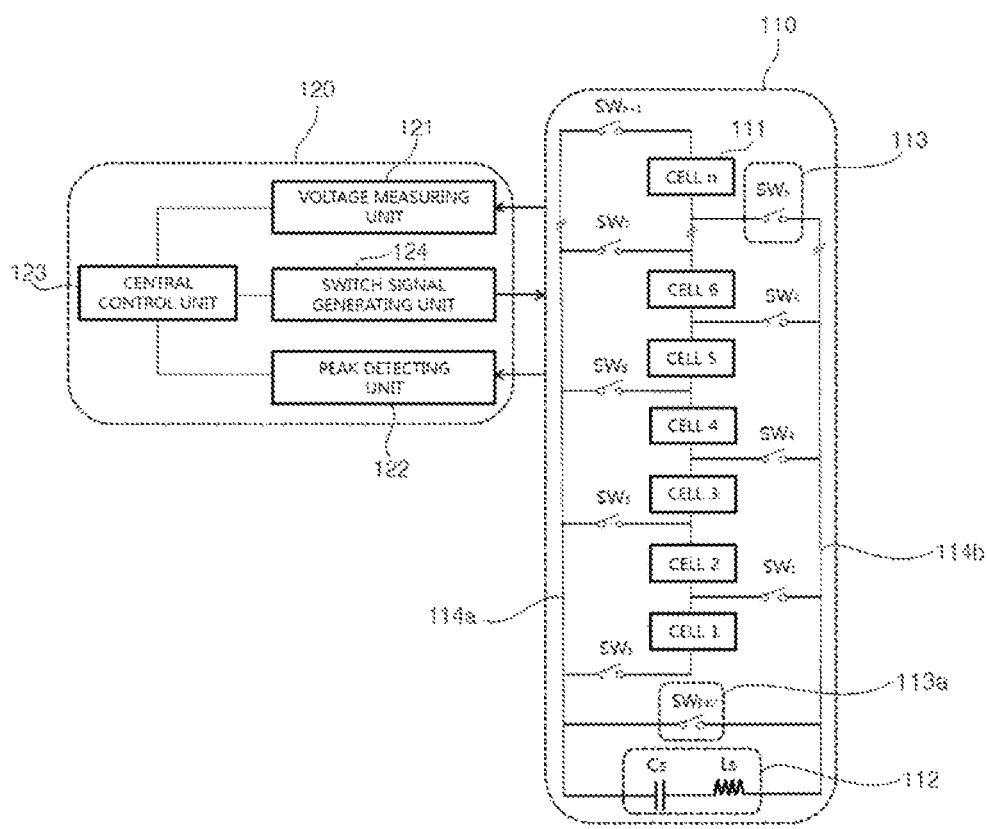

[Figure 2]
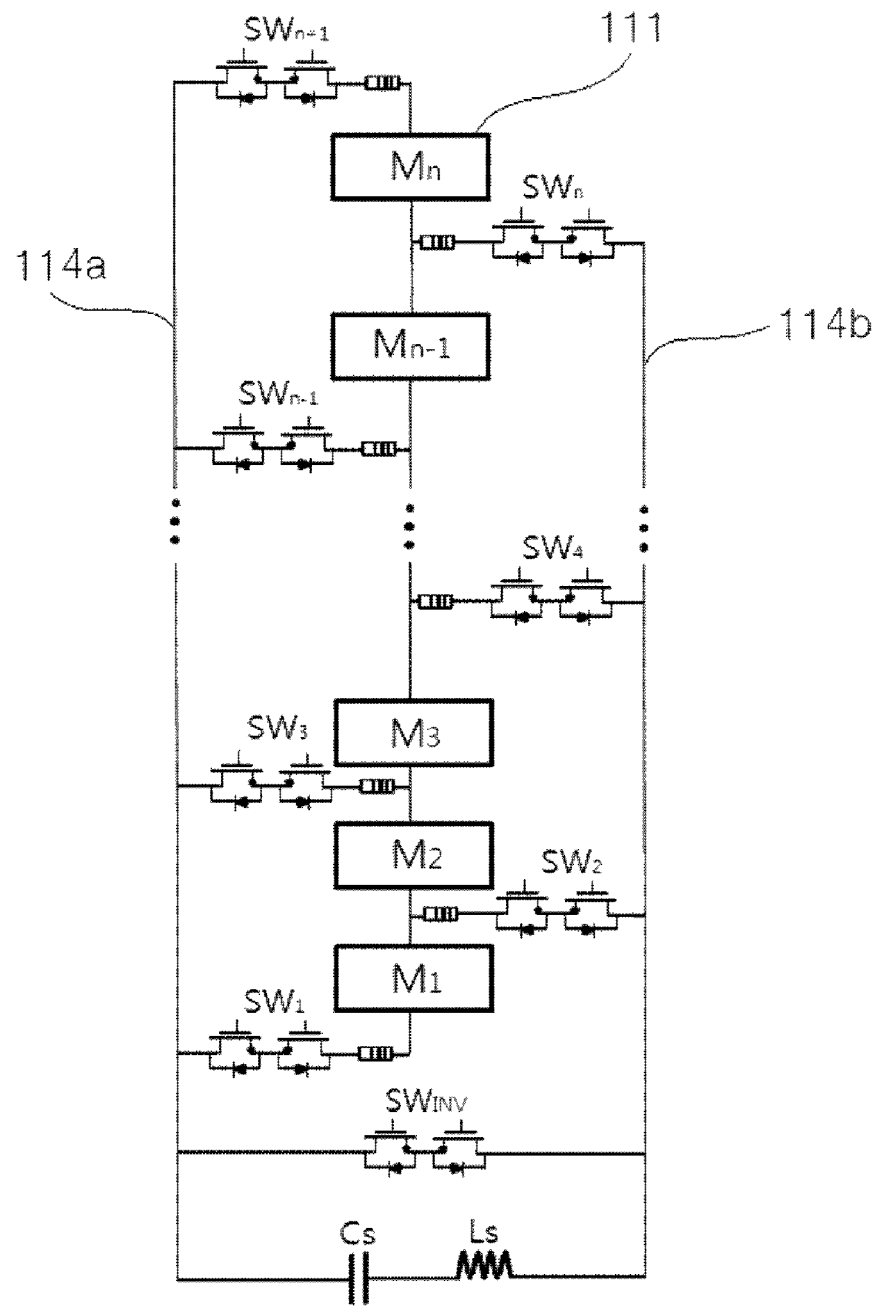

[Figure 3]
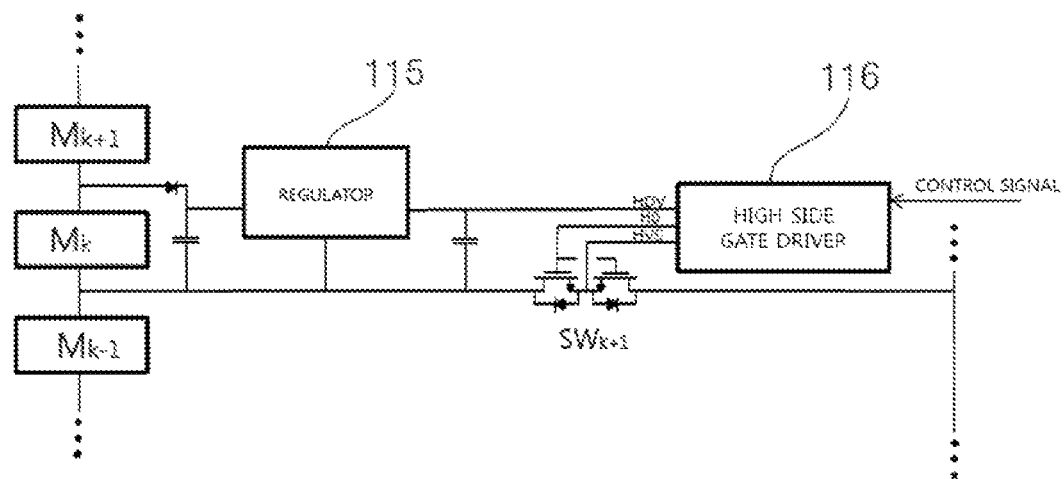

[Figure 4]
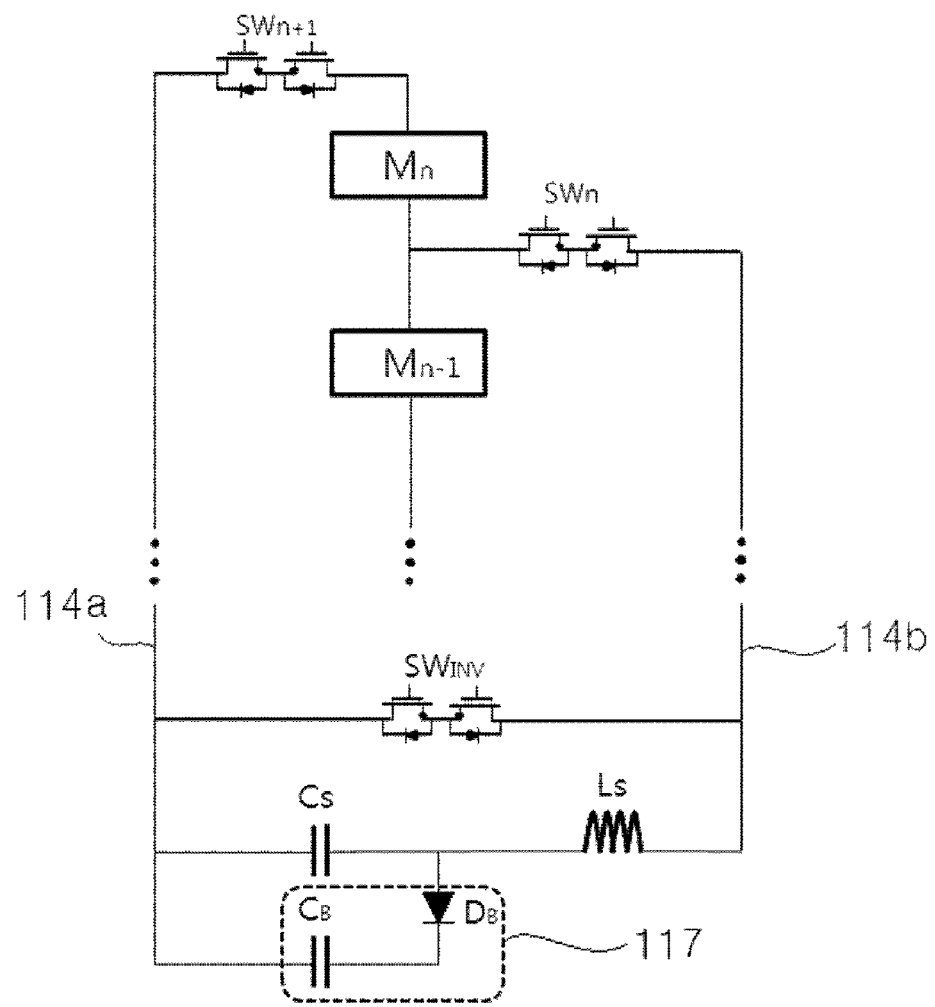

[Figure 5]
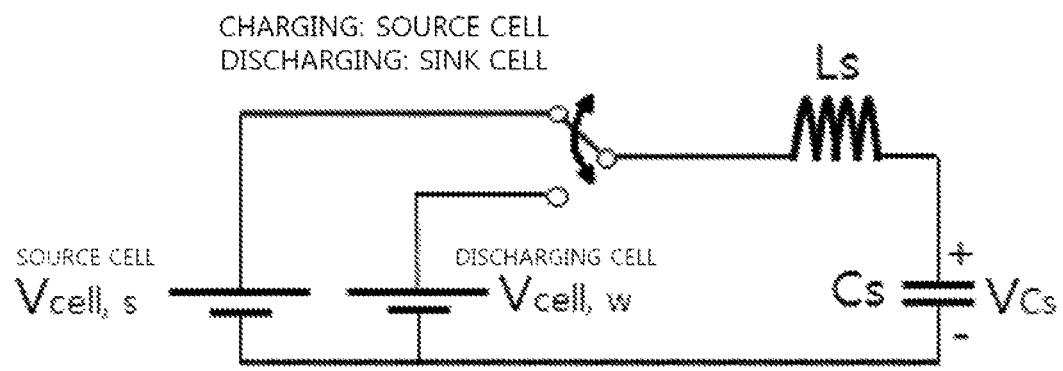

[Figure 6]
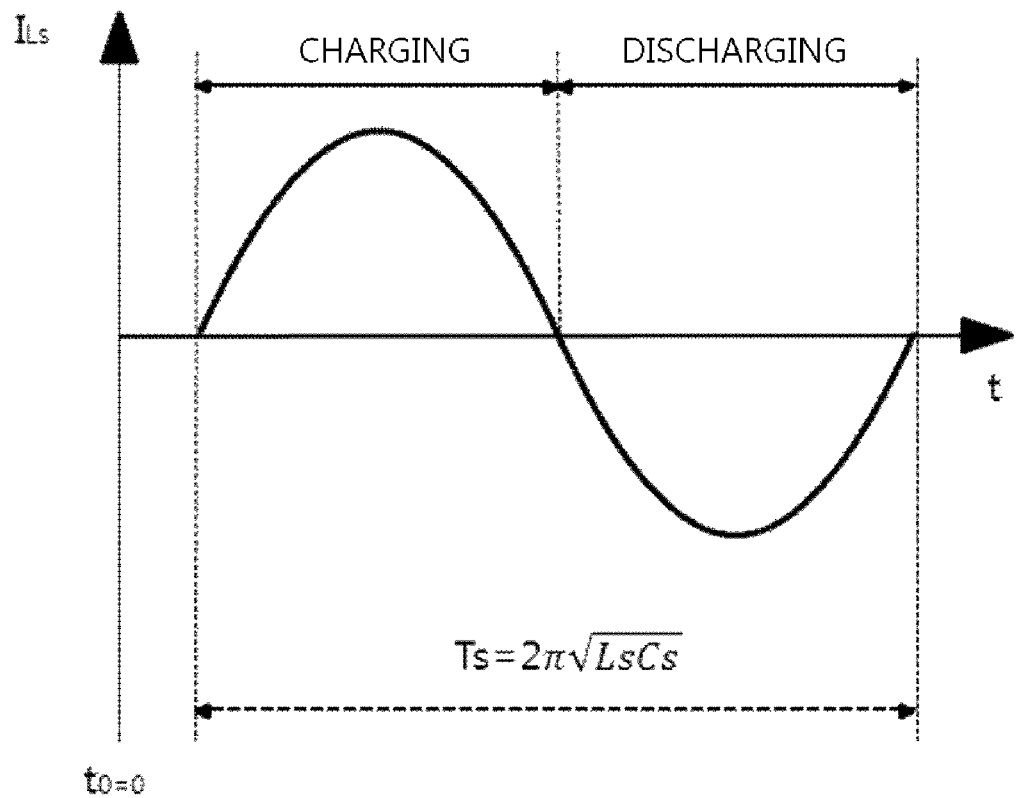
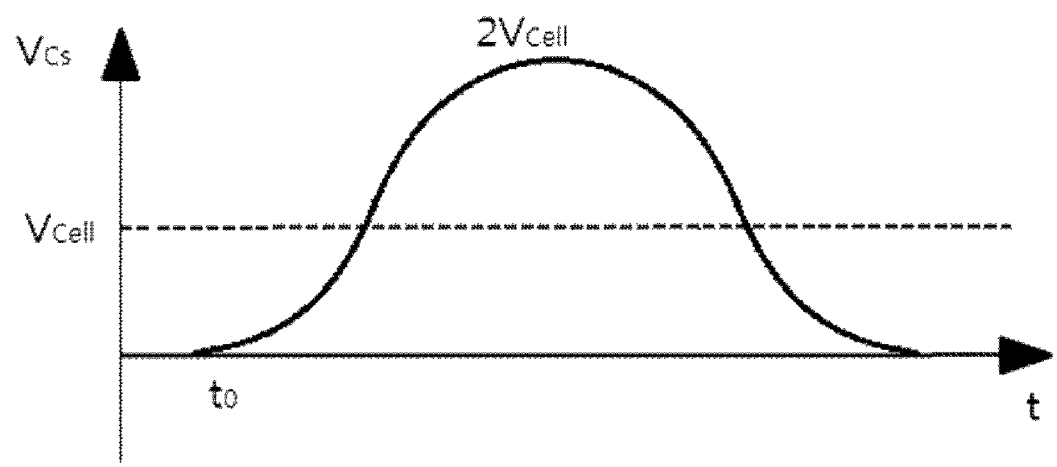

[Figure 7]
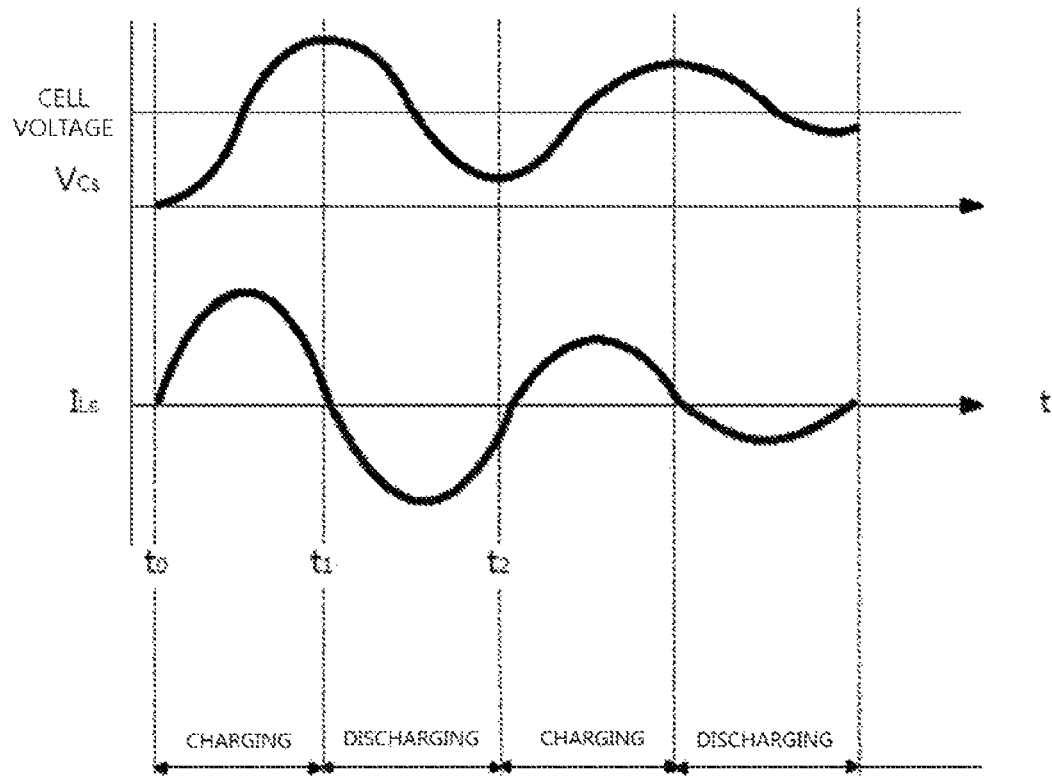
[Figure 8]
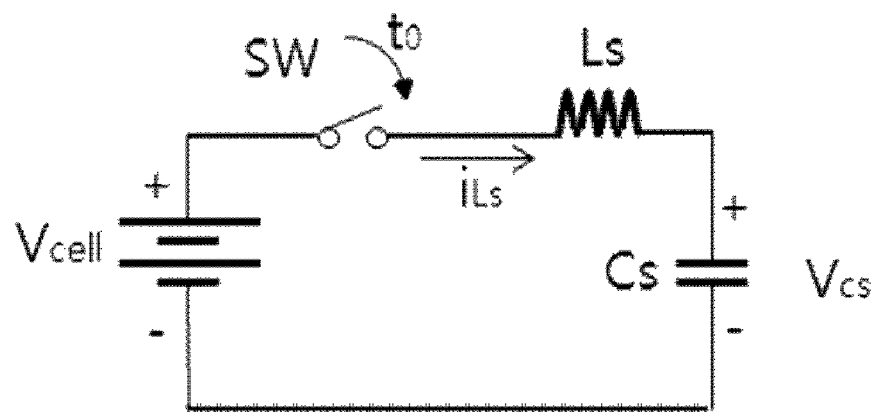

[Figure 9]
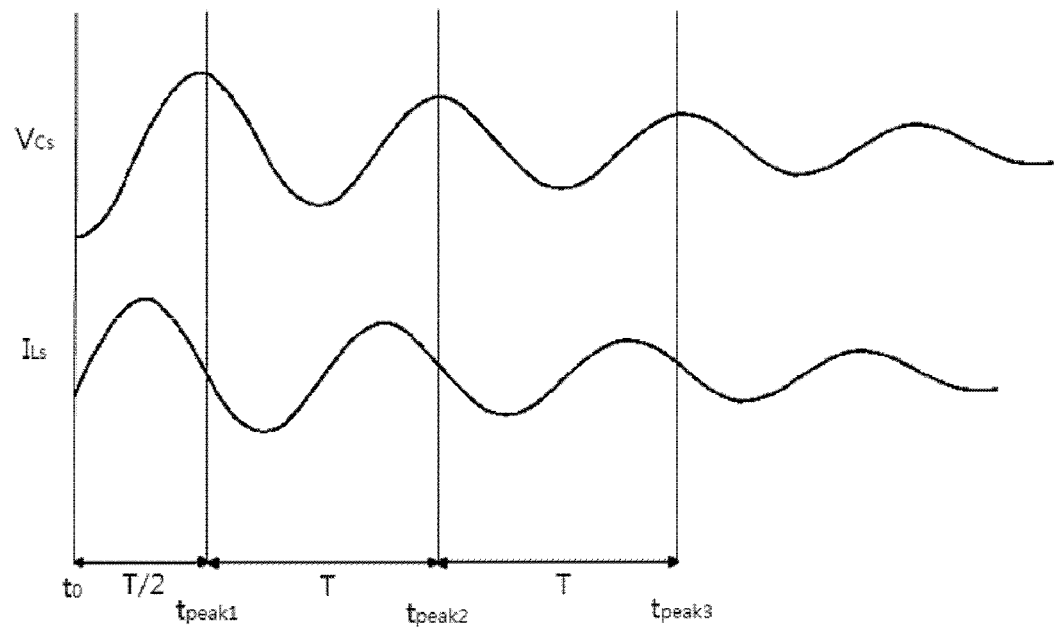

[Figure 10]
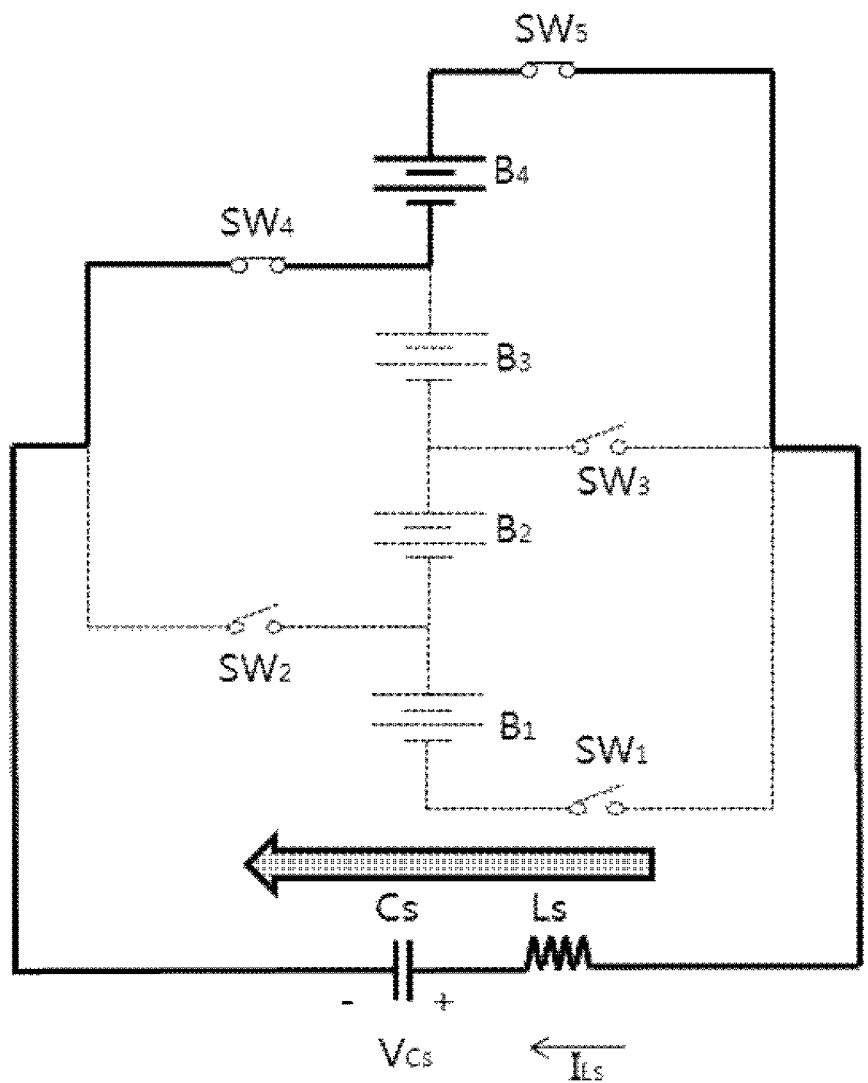

[Figure 11]
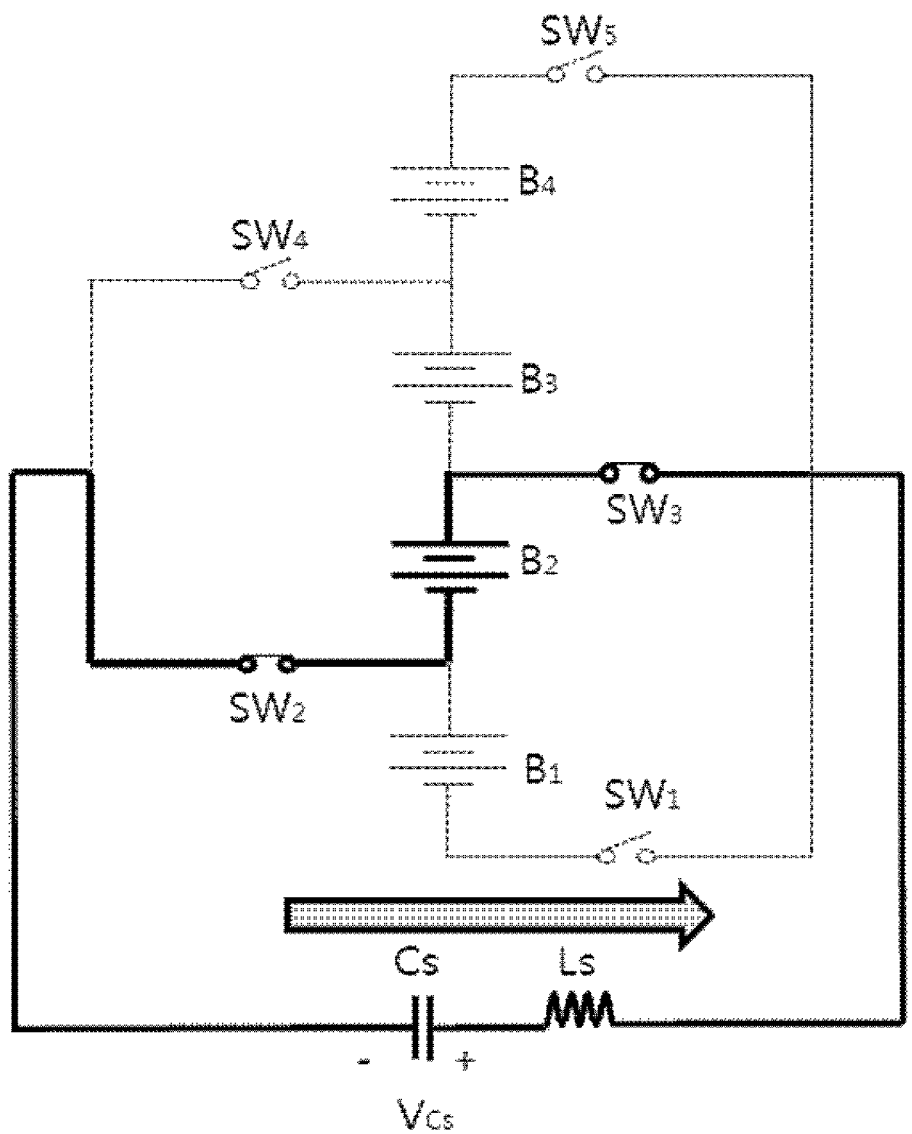

[Figure 12]
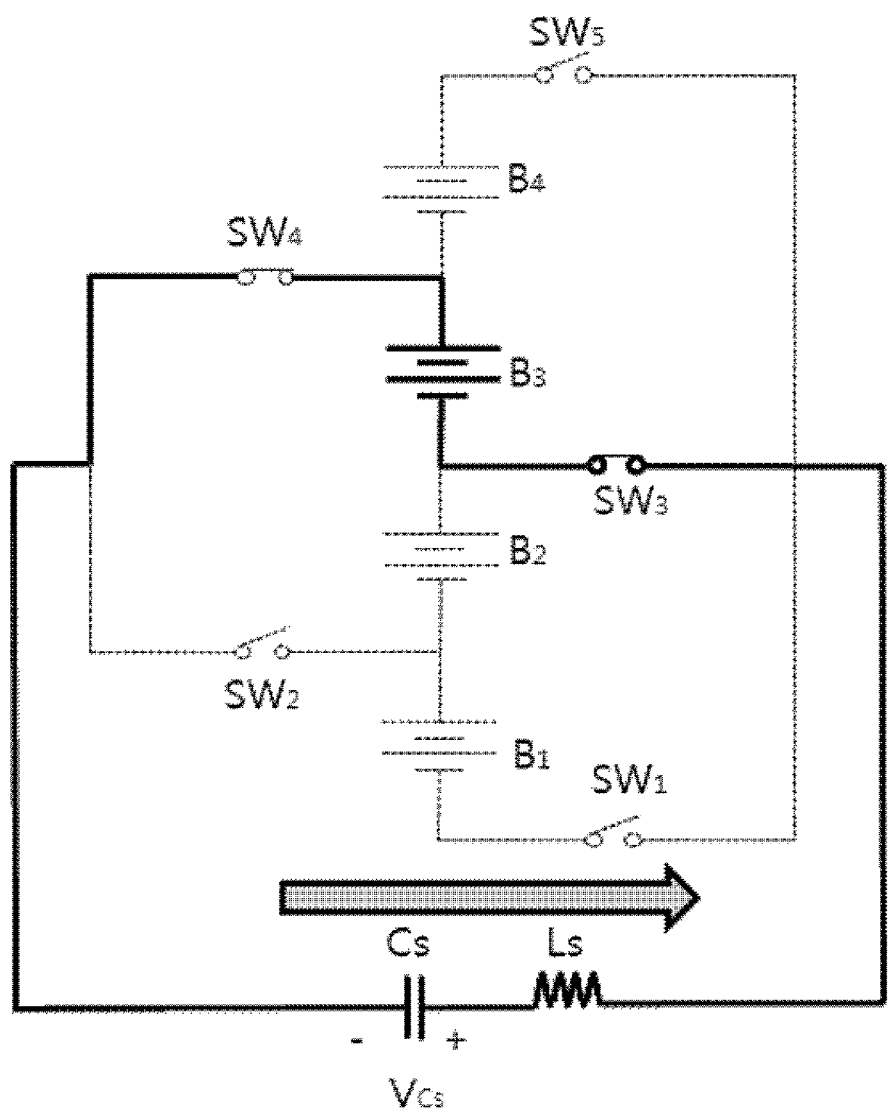

[Figure 13]
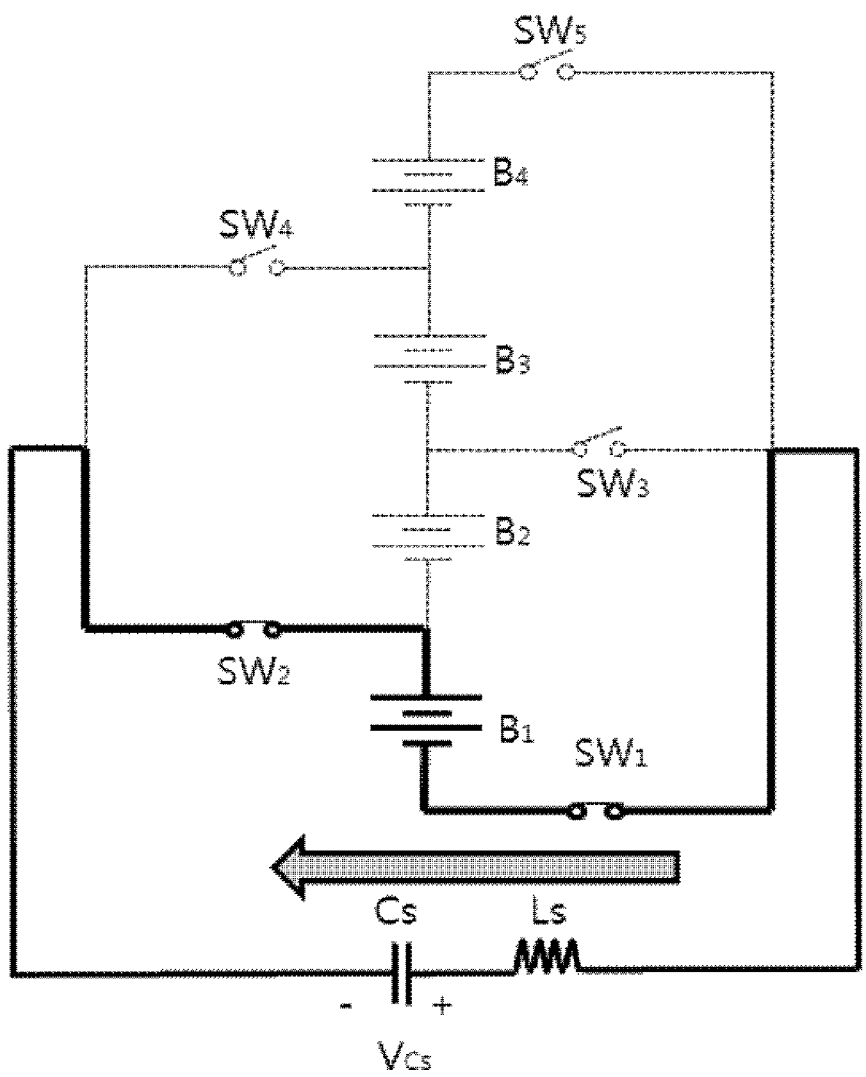

[Figure 14]
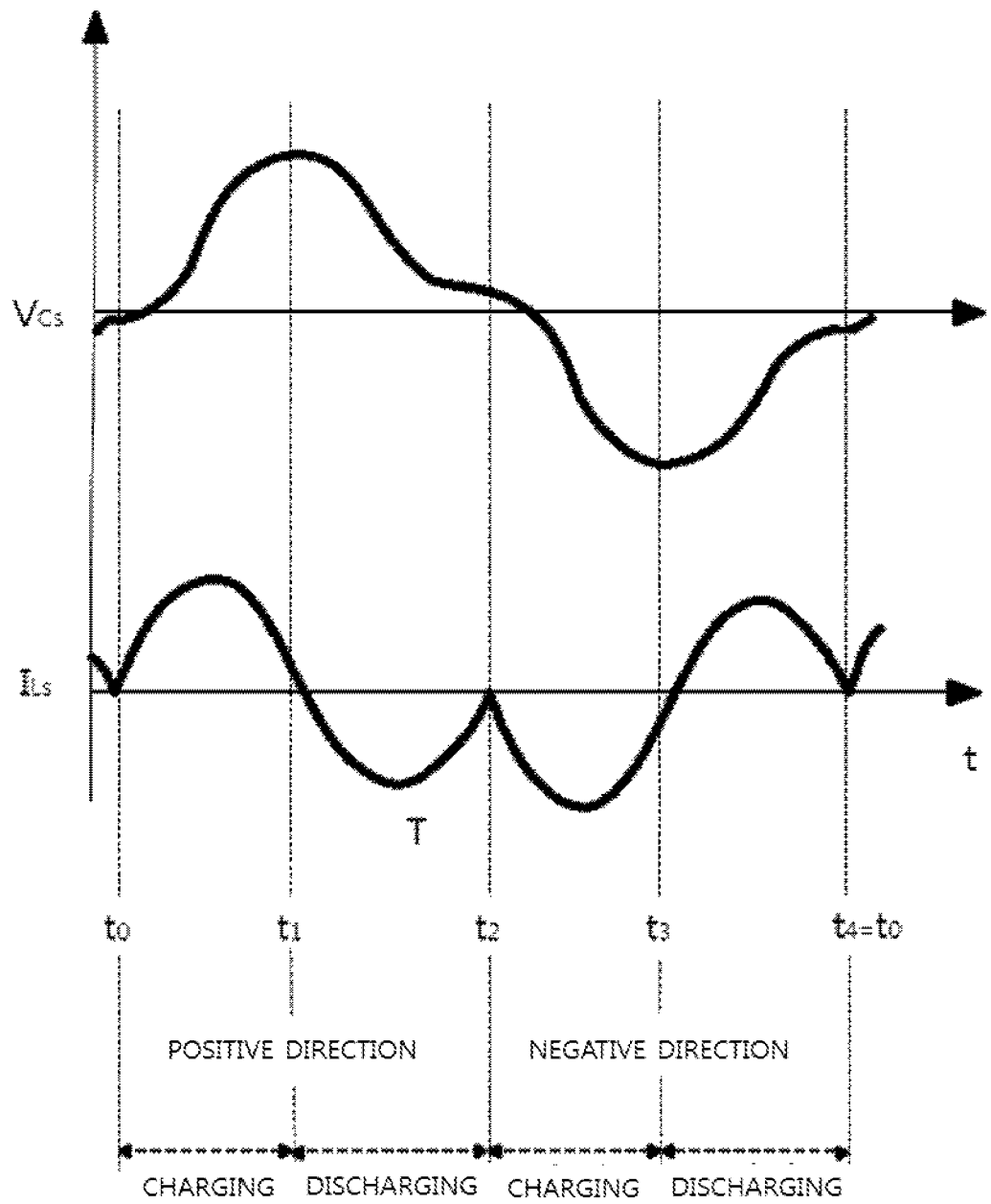

[Figure 15]
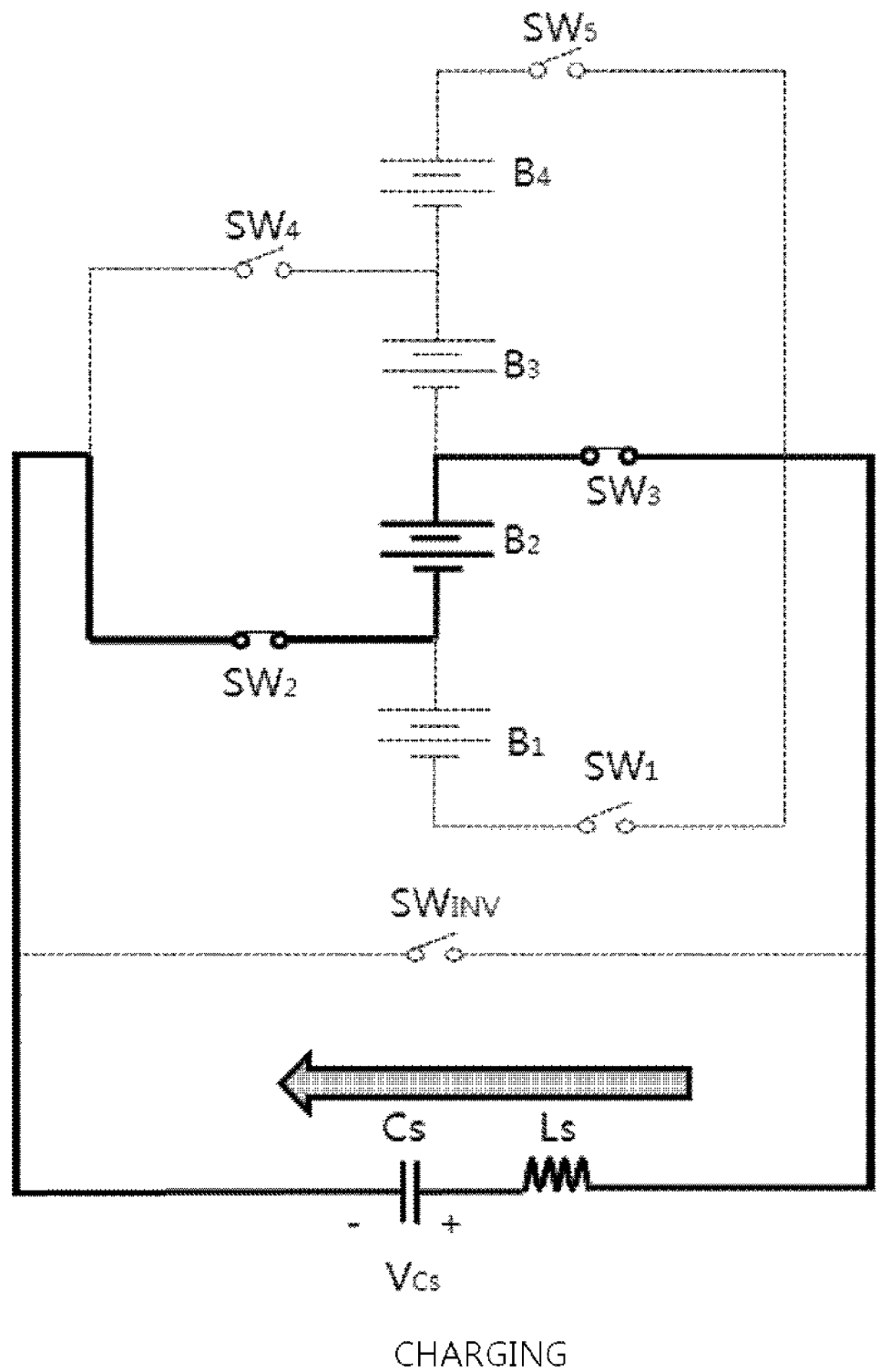
CHARGING

[Figure 16]
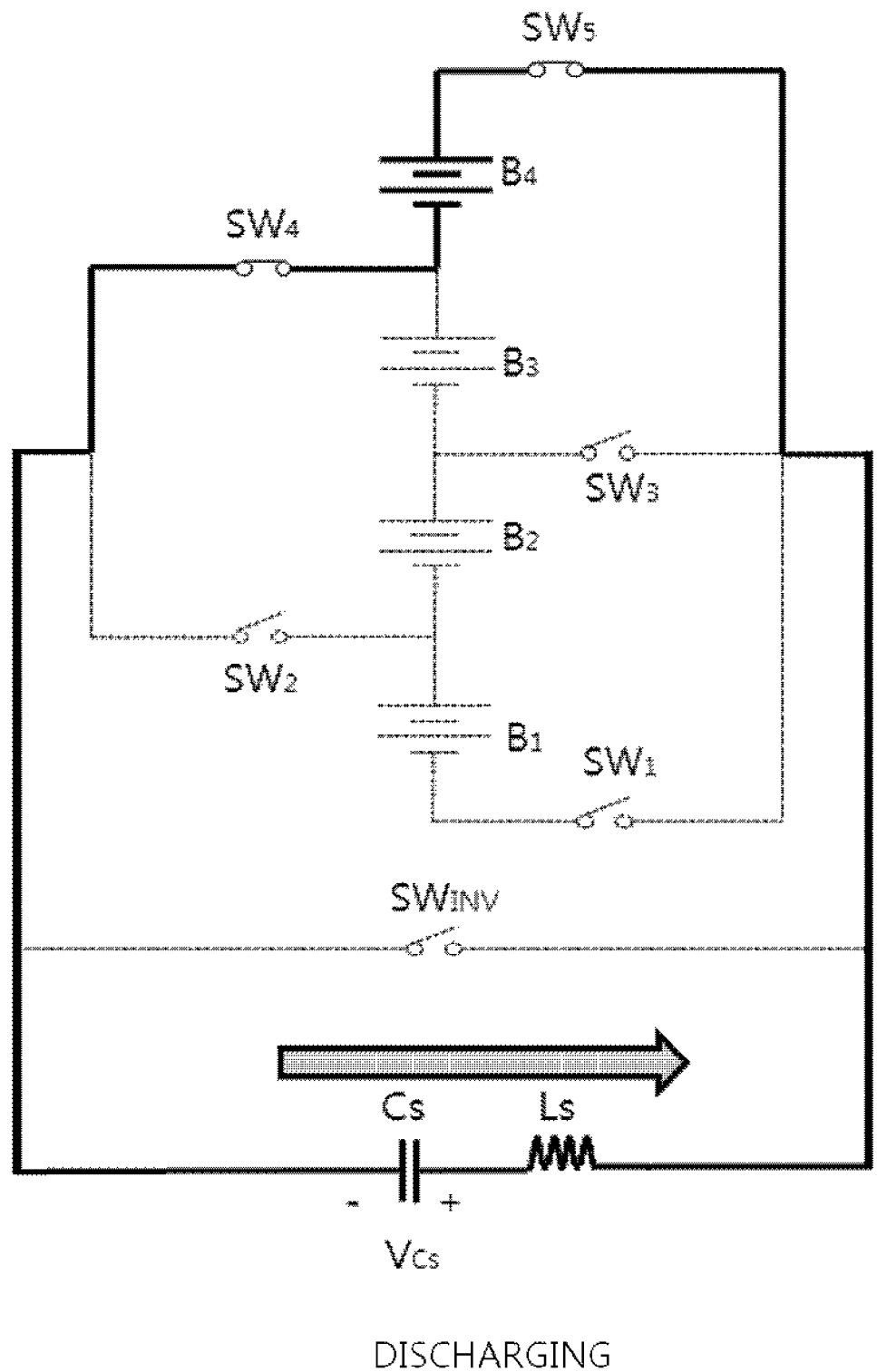
DISCHARGING

[Figure 17]
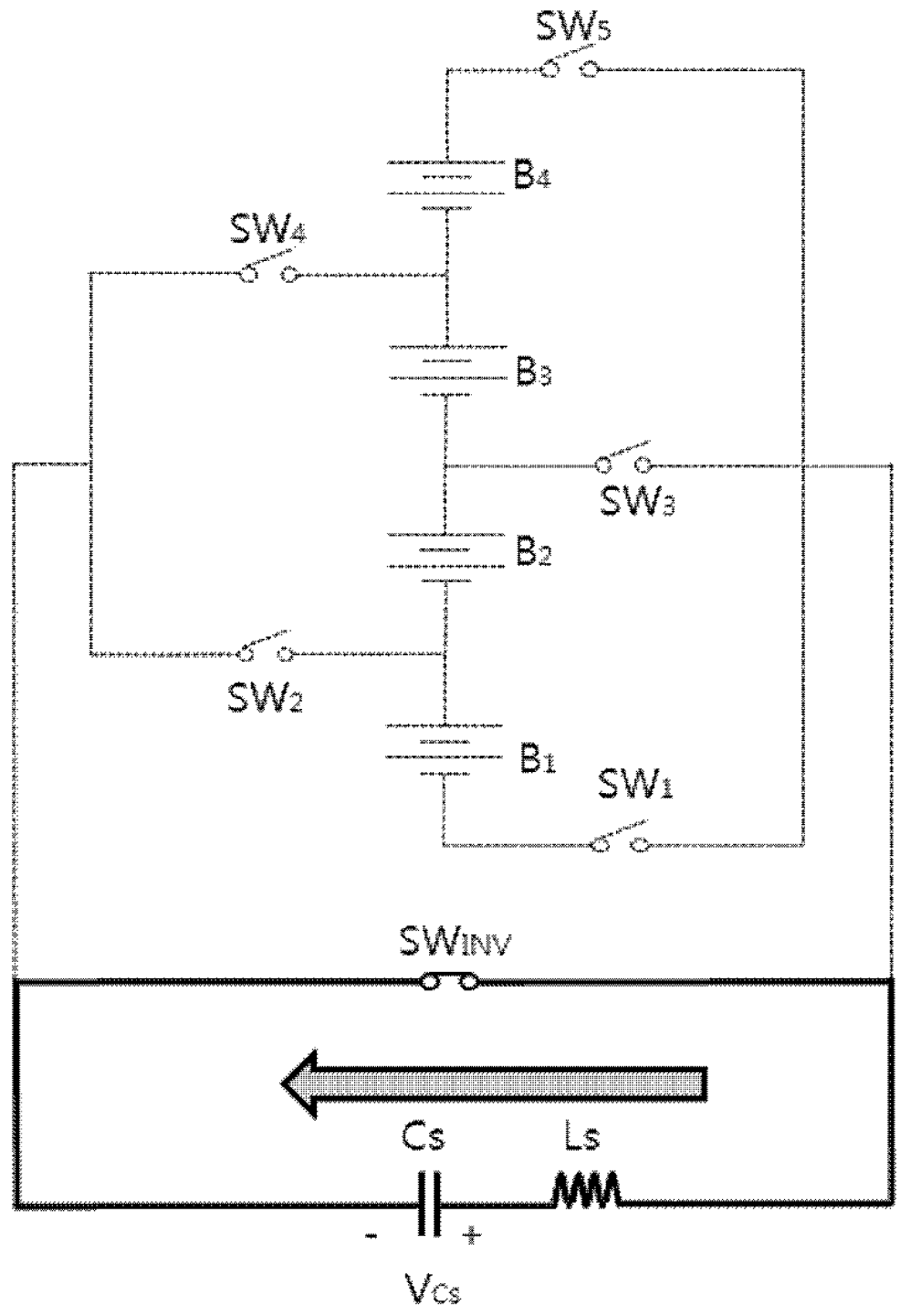
SWITCH CHARGING DIRECTION

[Figure 18]
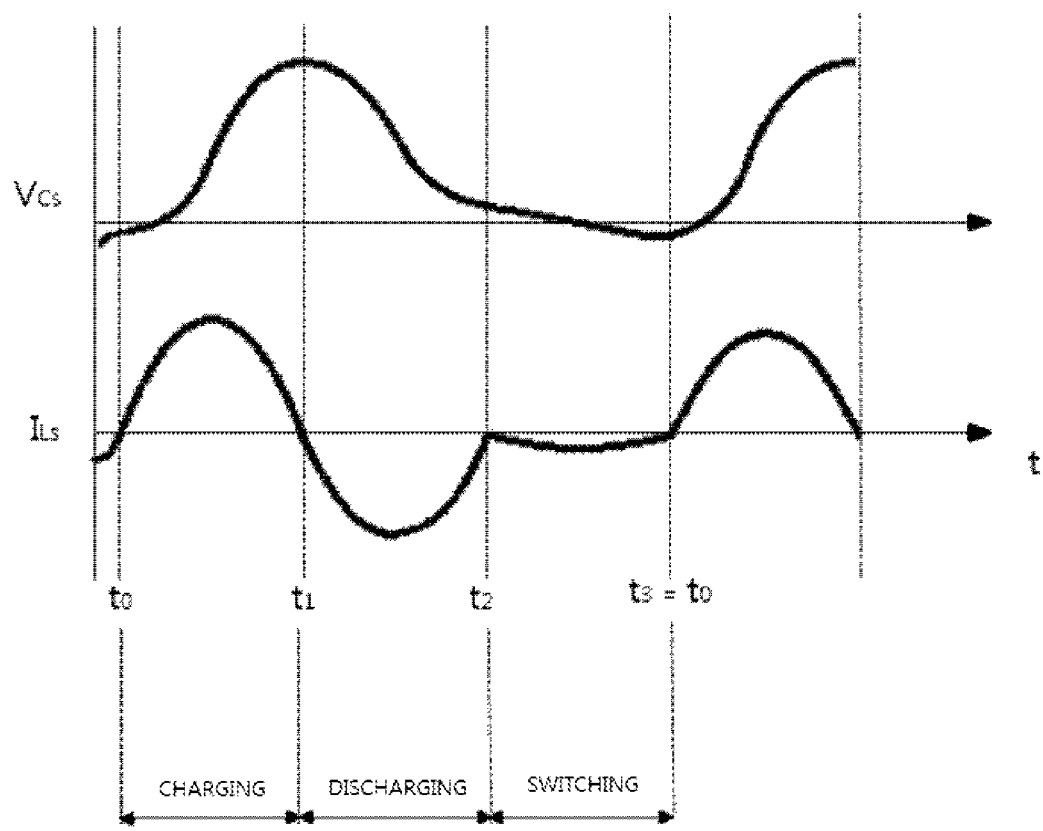

[Figure 19]
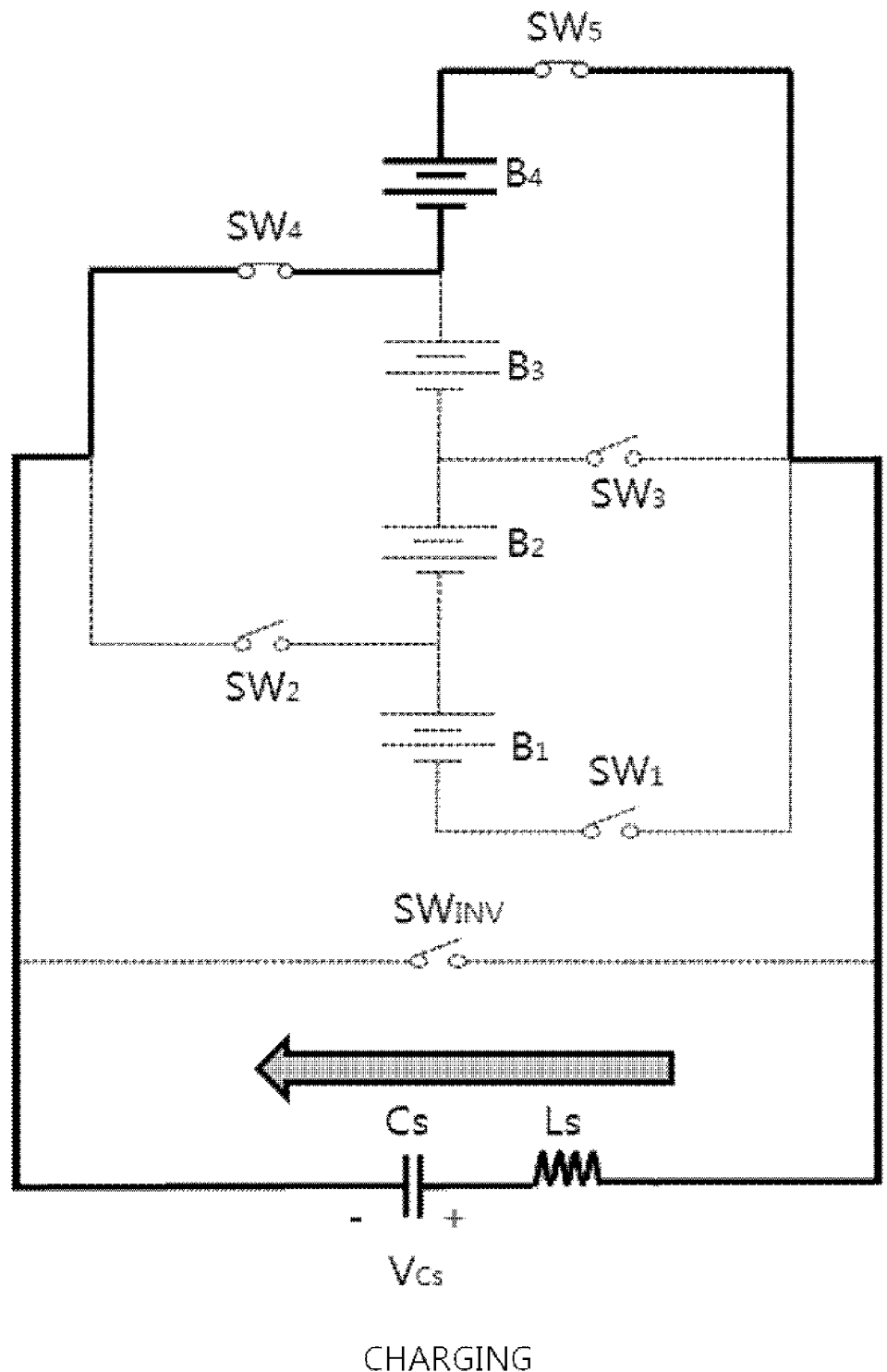
CHARGING

[Figure 20]
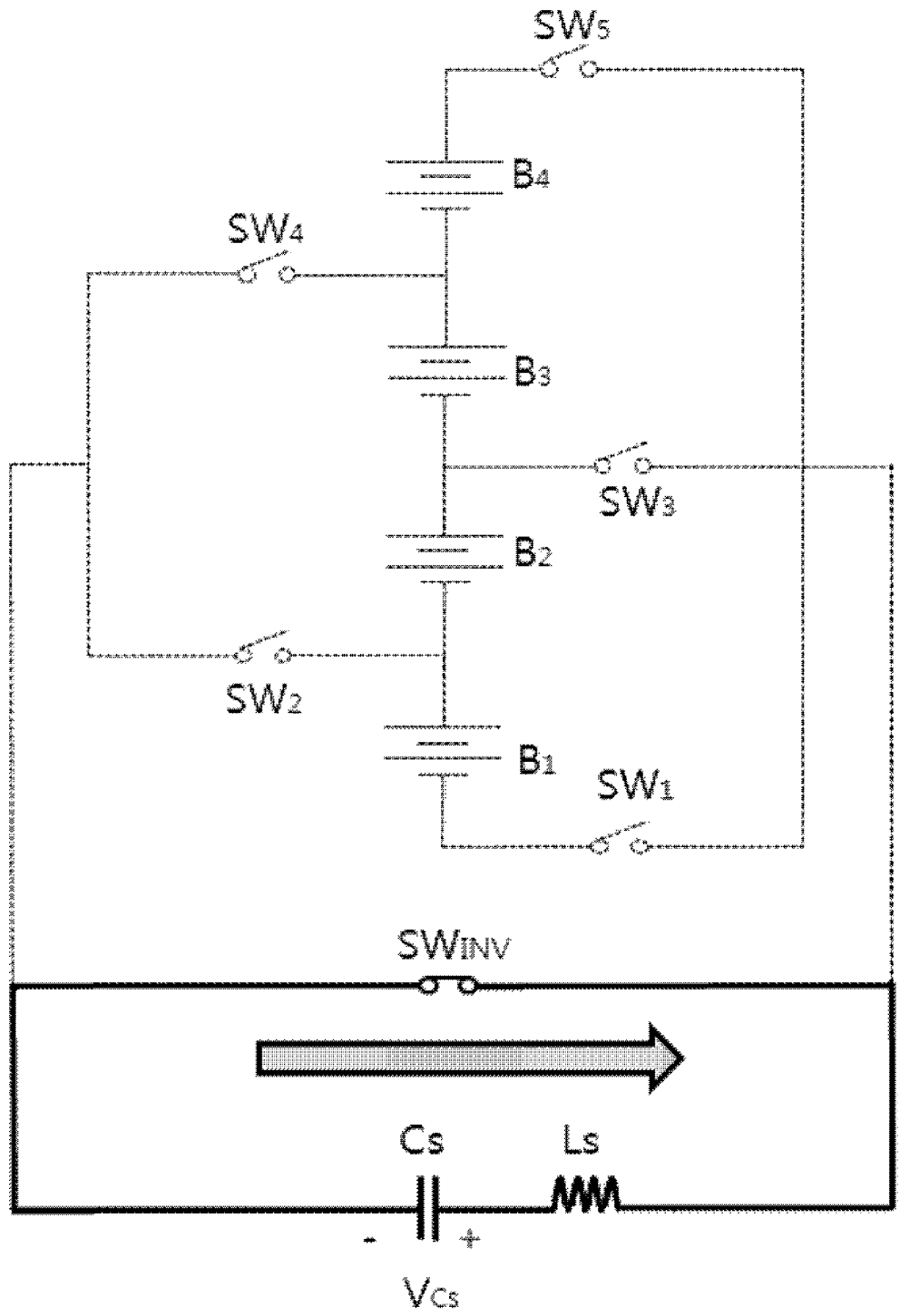
SWITCH CHARGING DIRECTION

[Figure 21]
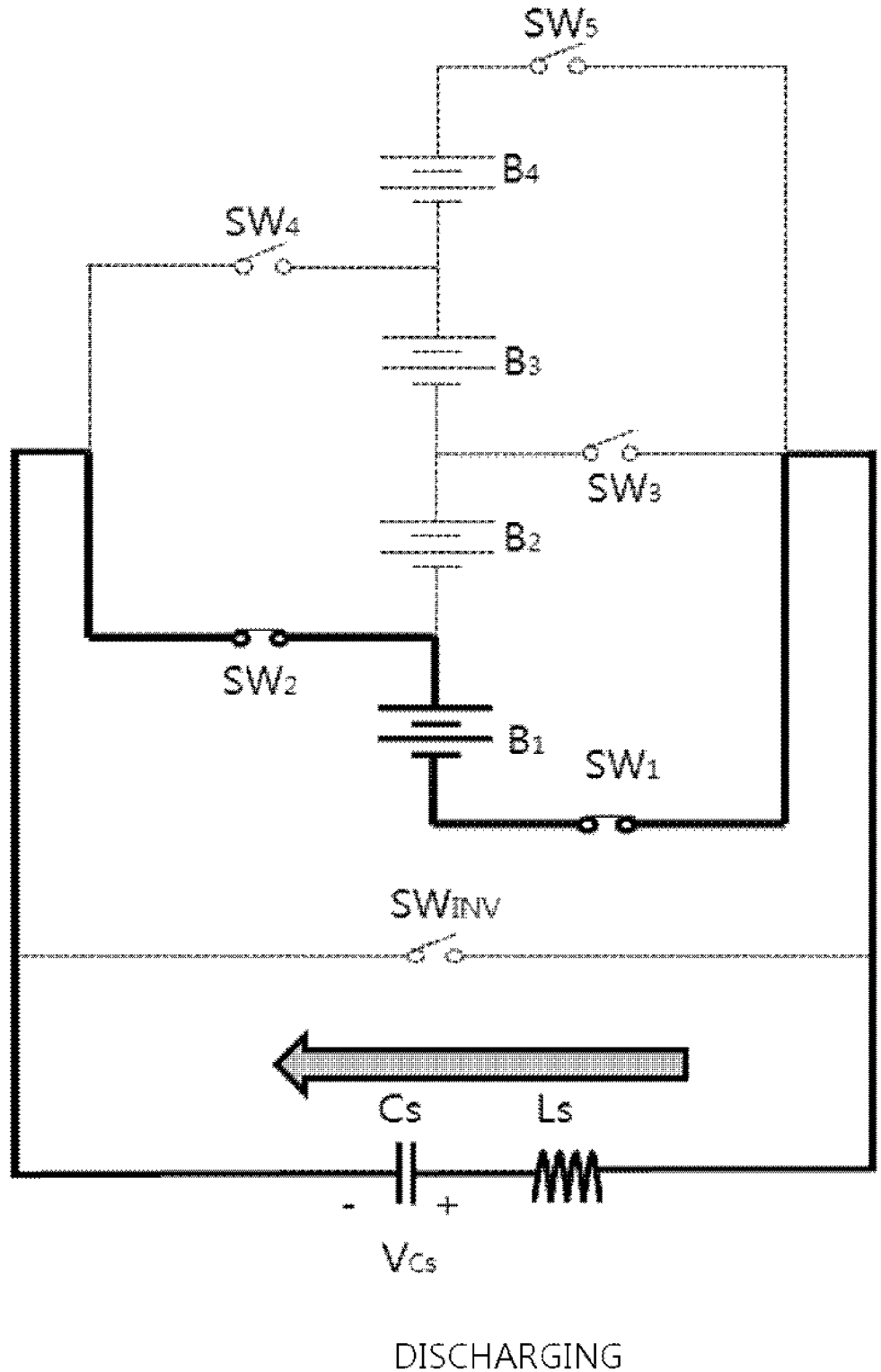
DISCHARGING

[Figure 22]
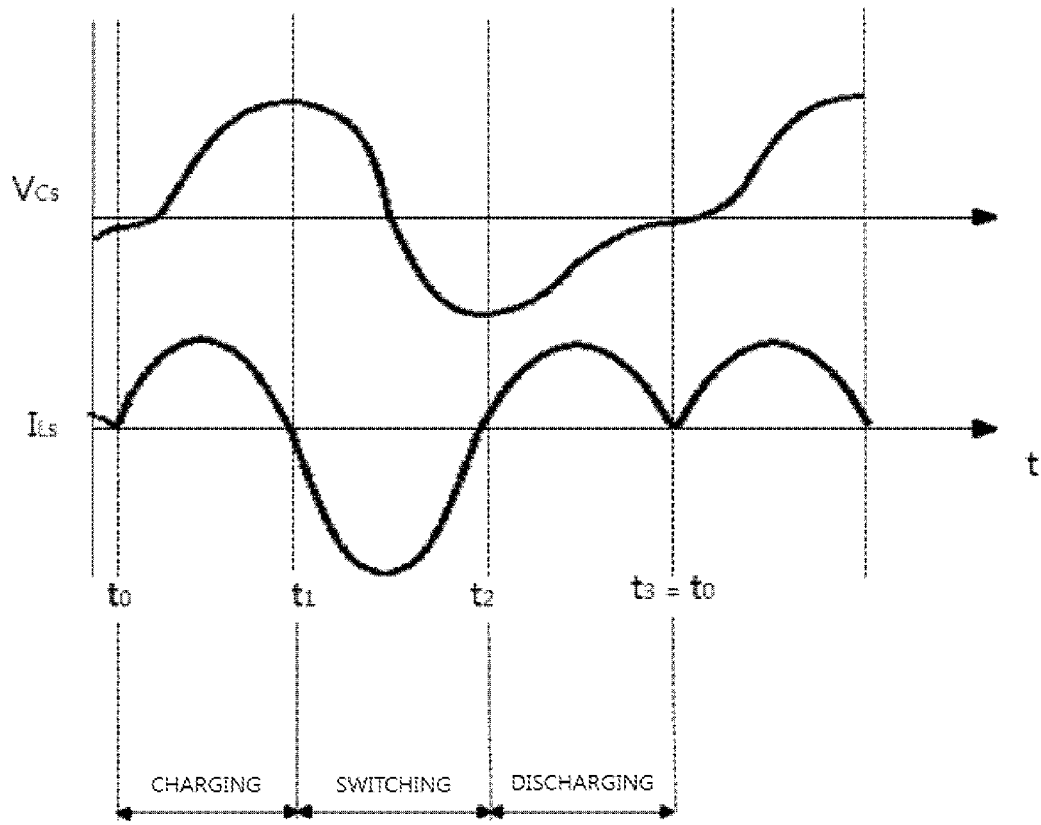

BATTERY CELL BALANCING SYSTEM AND METHOD USING LC RESONANCE

TECHNICAL FIELD

This application claims priority from Korean Patent Application No. 10-2014-0135548 filed on Oct. 8, 2014, in the KIPO, the disclosure of which is incorporated herein by reference in its entirety.

The present invention relates to a battery cell balancing system and method using LC resonance, and more particularly, to a battery cell balancing system and method using LC resonance which transfers charges between one or more battery cells using LC resonance to maintain an energy balance and measures an LC resonance period when a driving waveform is generated to keep an energy balance even when there is a deviation in an inductor or a capacitor, and specifically, performs a zero voltage switching operation to minimize power loss of a circuit.

BACKGROUND ART

Generally, when a voltage between both ends of a cell (a battery cell) exceeds a predetermined value, there is a risk of explosion and when the voltage drops below a predetermined value, damage may be caused in the battery cell. Specifically, since a hybrid electric vehicle or a notebook computer requires a relatively large quantity of power supply, when the power is supplied using a battery cell, a battery module (battery pack) in which battery cells are connected in series) needs to be used therefor. However, when such a battery module is used, an imbalance of voltage may be caused due to a performance deviation of individual battery cells.

Further, when the battery module is charged, if one battery cell in the battery module reaches an upper limit voltage earlier than other battery cells, the battery module is not charged any more. Therefore, the charging is completed in a state in which other battery cells are not sufficiently charged. In this case, a charging capacity of the battery module does not reach a rating charging capacity.

In the meantime, when the battery module is discharged, if one battery cell in the battery module reaches a lower limit voltage earlier than other battery cells, the battery module cannot be used any more. Therefore, a usage time of the battery module is correspondingly shortened.

Further, a voltage required in a load of a motor of a vehicle which uses a lithium ion battery pack is high (upto 400 V), so that a plurality of battery cells (90 to 100) is connected in series to obtain high voltage. In this case, since there is a difference in production deviations or operation temperature deviations of the plurality of battery cells, an imbalance of the voltage between cells may be caused and thus the available capacity and power may be reduced and aging of the battery cell may be accelerated.

DETAILED DESCRIPTION OF THE INVENTION

Technical Problem

The present invention has been made in an effort to provide a battery cell balancing system and method using LC resonance which transfers charges between one or more battery cells using LC resonance to keep an energy balance and measures an LC resonance period when a driving waveform is generated to keep an energy balance even when there is a deviation in an inductor or a capacitor, and specifically, performs a zero voltage switching operation to minimize power loss of a circuit.

Technical Solution

An exemplary embodiment of the present invention provides a battery cell balancing system using LC resonance including: a drive unit including one or more battery cells which are connected in series, a resonance module which performs a resonance operation, and a switch unit which transfers charges stored in the resonance module to the one or more battery cells; and a control unit which measures a resonance period of the resonance module in accordance with a voltage state of each of the one or more battery cells, and controls the switch unit to be turned on or off in accordance with the measured resonance period to transfer the charges charged in the resonance module to the one or more battery cells.

According to the exemplary embodiment, the switch unit may include a first switch including one or more switches which are connected between each terminal of the one or more battery cells and a first common node; a second switch including one or more switches which are connected between each terminal of the one or more battery cells and a second common node; and a change-over switch which is connected between the first and second common nodes.

According to the exemplary embodiment, the first switch, the second switch, and the change-over switch may be configured by single pole single throw (SPST) switches.

According to the exemplary embodiment, each of the first switch, the second switch, and the change-over switch may be configured by a pair of MOSFETs (metal oxide semiconductor field effect transistors).

According to the exemplary embodiment, when the remaining charge remains in the capacitor in a state in which a capacitor in the resonance module is in a releasing mode, the control unit may turn on the change-over switch to form an LC resonance circuit and invert a voltage polarity of the resonance module.

According to the exemplary embodiment, the control unit may perform a zero current switching operation which controls an on/off operation of the switch unit at a time corresponding to half a period of the resonance module.

According to the exemplary embodiment, the first switch which is located at the last end of the first common node and the change-over switch may be applied with a driving voltage generated by a separate boot strap circuit, and the remaining switches other than the first switch located at the last end of the first common node and the change-over switch may be applied with driving voltages from adjacent battery cells.

According to the exemplary embodiment, the control unit may include: a voltage measuring unit which measures a voltage of the one or more battery cells; a peak detecting unit which detects a resonance period from a voltage waveform peak of a resonance capacitor which is included in the resonance module; a central control unit which receives a voltage measuring result and a resonance period detecting result from the voltage measuring unit and the peak detecting unit and then determines whether to be a source module or a sink module; and a switch signal generating unit which generates a signal to turn on or off the switch unit in accordance with the determining result and outputs the signal to the drive unit.

According to the exemplary embodiment, the control unit may transfer the charges charged in the resonance module to the one or more battery cells based on a dual charge transferring mode in which the charges are transferred from one pair of battery cells to another pair of battery cells and a single charge transferring mode in which the charges are transferred from one battery cell to another battery cell.

According to the exemplary embodiment, in the dual charge transferring mode, the control unit may connect a first source cell and the resonance module to charge the resonance module in a positive direction and connect the resonance module and a first sink cell to discharge the resonance module in a positive direction, and the control unit may connect a second source cell and the resonance module to charge the resonance module in a negative direction and connect the resonance module and a second sink cell to discharge the resonance module in a positive direction, thereby preventing a voltage value of the resonance module from being converged to a voltage value of the battery cell.

According to the exemplary embodiment, in the single charge transferring mode, the control unit may connect a first source cell and the resonance module to charge the resonance module and connect the resonance module and a first sink cell to discharge the resonance module and then turn on the change-over switch to invert a voltage polarity of the resonance module, or the control unit may connect a first source cell and the resonance module to charge the resonance module and turn on the change-over switch to invert a voltage polarity of the resonance module and then connect the resonance module and a first sink cell to discharge the resonance module.

Another exemplary embodiment of the present invention provides a battery cell balancing method using LC resonance, including: connecting one or more battery cells in series and connecting a resonance module which performs a resonance operation and a switch unit; measuring a voltage state of each of the connected one or more battery cells and measuring a resonance period of the resonance module in accordance with the voltage state; and controlling an on/off operation of the connected switch unit to transfer charges charged in the resonance module to each of the one or more battery cells.

According to the exemplary embodiment, the connecting may include connecting one or more first switches between each terminal of the one or more battery cells and a first common node; connecting one or more second switch units between each terminal of the one or more battery cells and a second common node; and connecting a change-over switch between the first and second common nodes.

According to the exemplary embodiment, the connecting may include configuring each of the first switch, the second switch, and the change-over switch by a pair of MOSFETs (metal oxide semiconductor field effect transistors).

According to the exemplary embodiment, the transferring may include turning on the change-over switch to form an LC resonance circuit and invert a voltage polarity of the resonance module when the remaining charges remain in the capacitor in a state in which the capacitor in the resonance module is in a releasing mode.

According to the exemplary embodiment, the transferring may include performing a zero current switching operation which controls an on/off operation of the switch unit at a time corresponding to half a period of the resonance module.

According to the exemplary embodiment, the connecting may include connecting the first switch which is located at the last end of the first common node and the change-over switch to a separate boot strap circuit to be applied with a driving voltage generated by the separate boot strap circuit, and connecting the remaining switches other than the first switch located at the last end of the first common node and the change-over switch to adjacent battery cells to be applied with driving voltages from the adjacent battery cells.

According to the exemplary embodiment, the transferring may include: measuring a voltage of the one or more battery cells; detecting a resonance period from a voltage waveform peak of a resonance capacitor which is included in the resonance module; determining whether to be a source module or a sink module after receiving a voltage measuring result and a resonance period detecting result from the voltage measuring unit and the peak detecting unit; and generating a signal to turn on or off the switch unit in accordance with the determining result and outputting the signal to the drive unit.

According to the exemplary embodiment, the transferring may include: transferring the charges charged in the resonance module to the one or more battery cells based on a dual charge transferring mode in which the charges are transferred from one pair of battery cells to another pair of battery cells and a single charge transferring mode in which the charges are transferred from one battery cell to another battery cell.

According to the exemplary embodiment, the transferring may include: allowing the control unit to connect a first source cell and the resonance module to charge the resonance module in a positive direction and connect the resonance module and a first sink cell to discharge the resonance module in a positive direction, and allowing the control unit to connect a second source cell and the resonance module to charge the resonance module in a negative direction and connect the resonance module and a second sink cell to discharge the resonance module in a positive direction, thereby preventing a voltage value of the resonance module from being converged to a voltage value of the battery cell.

According to the exemplary embodiment, the transferring may include: allowing the control unit to connect a first source cell and the resonance module to charge the resonance module and connect the resonance module and a first sink cell to discharge the resonance module and then turn on the change-over switch to invert a voltage polarity of the resonance module, and allowing the control unit to connect a first source cell and the resonance module to charge the resonance module and turn on the change-over switch to invert a voltage polarity of the resonance module, and then connect the resonance module and a first sink cell to discharge the resonance module.

Advantageous Effects

According to the present invention, a resonance period of a waveform generated in an LC resonance module is measured, so that a switch may be controlled in accordance with the resonance period even though there is a deviation in an inductor or a capacitor, to uniformly transfer charges, thereby keeping an energy balance.

Further, according to the present invention, a zero voltage switching operation is performed, to minimize heating of the switch, thereby reducing heat generated in an element and significantly improving a lifespan of the element.

Furthermore, according to the present invention, energy exchange between one or more battery cells is allowed, so that loss by hard switching is minimized and the energy is transmitted from a battery cell having high energy to a battery cell having low energy, thereby improving a battery performance.

BRIEF DESCRIPTION OF DRAWINGS

FIG. 1 is a block diagram schematically illustrating a configuration of a battery cell balancing system 100 using LC resonance according to an exemplary embodiment of the present invention.

FIG. 2 is a view more specifically illustrating a configuration of a drive unit 110 illustrated in FIG. 1.

FIGS. 3 and 4 are views more specifically illustrating a state in which a switch unit 113 illustrated in FIG. 1 is applied with a driving voltage.

FIGS. 5 and 6 are views explaining a charge transferring process of a battery cell balancing system 100 using LC resonance according to an exemplary embodiment of the present invention.

FIG. 7 is a view illustrating a state in which a voltage value of a resonance module 112 is converged with a voltage value of a battery cell 111.

FIGS. 8 and 9 are views illustrating a method of measuring a resonance period of a resonance module 112 in a control unit 120 according to an exemplary embodiment of the present invention.

FIG. 10 is a view schematically illustrating a positive collecting step of a dual charge transferring mode among charge transferring methods of a battery cell balancing system 100 using LC resonance according to an exemplary embodiment of the present invention.

FIG. 11 is a view schematically illustrating a positive releasing step of a dual charge transferring mode among charge transferring methods of a battery cell balancing system 100 using LC resonance according to an exemplary embodiment of the present invention.

FIG. 12 is a view schematically illustrating a negative collecting step of a dual charge transferring mode among charge transferring methods of a battery cell balancing system 100 using LC resonance according to an exemplary embodiment of the present invention.

FIG. 13 is a view schematically illustrating a negative releasing step of a dual charge transferring mode among charge transferring methods of a battery cell balancing system 100 using LC resonance according to an exemplary embodiment of the present invention.

FIG. 14 is a view schematically illustrating an operating waveform in a dual charge transferring mode of a resonance module 112 according to an exemplary embodiment of the present invention.

FIGS. 15 to 17 are views explaining a single charge transferring mode among charge transferring methods of a battery cell balancing system 100 using LC resonance according to an exemplary embodiment of the present invention.

FIG. 18 is a view schematically illustrating an operating waveform in which a resonance module 112 according to an exemplary embodiment of the present invention operates in the single charge transferring mode illustrated in FIGS. 15 to 17.

FIGS. 19 to 21 are views explaining a single charge transferring mode of a battery cell balancing system 100 using LC resonance according to another exemplary embodiment of the present invention.

FIG. 22 is a view schematically illustrating an operating waveform in which a resonance module 112 according to an exemplary embodiment of the present invention operates in the single charge transferring mode illustrated in FIGS. 19 to 21.

BEST MODE

Hereinafter, preferred embodiments will be suggested for better understanding of the present invention. However, the following embodiments are provided only for more understanding the present invention, and thus the present invention is not limited thereto.

FIG. 1 is a block diagram schematically illustrating a configuration of a battery cell balancing system 100 using LC resonance according to an exemplary embodiment of the present invention, FIG. 2 is a view more specifically illustrating a configuration of a drive unit 110 illustrated in FIG. 1, and FIGS. 3 and 4 are views more specifically illustrating a state in which a switch unit 113 illustrated in FIG. 1 is applied with a driving voltage.

Referring to FIGS. 1 to 4, a battery cell balancing system 100 using LC resonance according to the present invention includes a drive unit 110 and a control unit 120.

First, the drive unit 110 includes one or more battery cells 111 which are connected in series, a resonance module 112 which performs a resonance operation, and a switch unit 113 which transfers the charge stored in the resonance module to one or more battery cells 111 and further includes a resistor 118.

One or a plurality of battery cells 111 is connected in series in a battery module and the plurality of battery cells 111 is connected in series to configure a high voltage battery pack.

The resonance module 112 includes an inductor Ls and a capacitor Cs which are connected in series and the resonance module 112 uses a known related art so that detailed description thereof will be omitted.

The switch unit 113 forms a supply path which transmits the charges stored in the above-described resonance module to each of the one or more battery cells 111, collects the charges from a battery cell having a relatively high electric charge quantity, and supplies the charges to a battery cell having a relatively low electric charge quantity.

In this case, in the drive unit 110, the one or more battery cells 111 are connected to the resonance module 112 through first and second common nodes 114a and 114b and more particularly, the first common node 114a is connected to one terminal of the battery cell 111 which is located at the last end among the battery cells 111 which are connected in series starting from a position which is adjacent to the capacitor Cs of the resonance module 112. Further, the second common node 114b is connected to the other terminal of the battery cell 111 which is located at the last end among the battery cells 111 which are connected in series starting from a position which is adjacent to the inductor Ls of the resonance module 112.

To be more specific, referring to FIG. 2, it is assumed that a battery cell 111 at a forefront end of the one or more battery cells 111 which are connected in series is $M_1$ and a battery cell at a last end is $M_n$.

It is understood that the first common node 114a is connected to one terminal of the battery cell $M_1$ through a switch $SW_1$, the first common node 114a is connected to one terminal of the battery cell $M_3$ through a switch $SW_3$, and the first common node 114a is connected to one terminal of the battery cell $M_5$ through a switch $SW_5$.

That is, the first common node 114a and one terminals of odd-numbered battery cells such as $M_1$, $M_3$, and $M_5$ are connected to odd-numbered switches such as $SW_1$, $SW_3$, and $SW_5$ and specifically, the other terminal of the last battery cell $M_n$ is connected to the first common node 114a and a switch is $SW_{n+1}$ in this case.

Further, the second common node 114b is connected to the other terminal of a battery cell $M_1$ through a switch $SW_2$ and the second common node 114b is connected to the other terminal of the battery cell $M_3$ through a switch $SW_4$.

That is, the second common node 114b and one terminals of even-numbered battery cells such as $M_2$, $M_4$, and $M_6$ respectively connected to even-numbered switches such as $SW_2$, $SW_4$, and $SW_6$ and specifically, one terminal of the last battery cell $M_n$ is connected to the second common node 114b and a switch is $SW_n$ in this case.

In one exemplary embodiment, the switch unit 113 included in the drive unit 110 may be a single pole single throw (SPST) switch.

Further, such a switch unit 113 may be configured by a pair of MOSFETs (metal oxide semiconductor field effect transistor).

In order to drive the switch unit 113 included in the drive unit 110, a driving voltage needs to be applied thereto, which will be described in more detail with reference to FIGS. 3 and 4 below.

The resistor 118 is provided between the battery cell 111 and the switch unit 113 and serves as a fuse to prevent overcurrent from flowing in a circuit due to a damaged or broken switch unit 113.

Referring to FIGS. 3 and 4, switches other than the switch $SW_{n+1}$ located at the last end of the first common node 114a and a change-over switch 113a are applied with driving voltages from adjacent battery cell modules in order to be applied with a gate driving voltage of 10 to 15 v to drive the MOSFETs.

That is, a voltage of each of the battery cells may rapidly change in accordance with a charging/discharging state of the battery cell, so that a diode and a capacitor are used to form a stable power and a regulator 115 may be provided to form a voltage which is appropriate to drive the MOSFETs. Therefore, the drive unit 110 transmits a control signal transmitted from a control unit 120 which will be described below to a high side gate driver 116 and the high side driver 116 controls the MOSFETS in accordance with the control signal.

In contrast, referring to FIG. 4, the switch $SW_{n+1}$ located at the last end of the first common node 114a and the change-over switch 113a are applied with a driving voltage generated by a separate boot strap circuit 117 to be driven and the boot strap circuit 117 includes a capacitor $C_B$ and a diode $D_B$.

When charges are charged in the capacitor Cs, the charges are also charged in the capacitor Cb and the charges charged in the capacitor Cb are transferred to the switch $SW_{n+1}$ located at the last end of the first common node 114a and the change-over switch 113a.

In the meantime, the change-over switch 113a may refer to a charge inversion switch and specifically, inverses a polarity of a voltage of the capacitor of the resonance module 112, which will be described in more detail with reference to FIGS. 5 to 7.

FIGS. 5 and 6 are views explaining a charge transferring process of a battery cell balancing system 100 using LC resonance according to an exemplary embodiment of the present invention.

Referring to FIGS. 5 and 6, in a state in which a capacitor $C_s$ of the resonance module 112 is empty, when the switch unit 113 is turned on to connect the resonance module 112 to a source cell (a battery cell which loses charges during a charge equalizing process of each of the one or more battery cells 111), a current flows into a capacitor of the resonance module 112 from the source cell and a voltage of the capacitor may increase to be up to two times higher than that of the source cell (in this case, the resonance module 112 is in a collecting mode). When the switch unit 113 is connected to a sink cell (a battery cell which obtains charges during a charge equalizing process of each of the one or more battery cells 111) in a state in which the capacitor is charged at the maximum, the voltage of the capacitor is reduced to be zero (in this case, the resonance module 112 is in a releasing mode).

By repeatedly performing the collecting mode and the releasing mode, the charges are transferred from the source cell to the sink cell.

In the meantime, the voltage of the capacitor is not completely zero, due to a resistive component remaining in the battery cell balancing system 100 using the LC resonance and the remaining charges remain. When the collecting mode and the releasing mode are repeatedly performed in this state, the voltage value by the remaining charges of the capacitor is converged to the battery cell 111, so that the switch unit 113 may not normally operate as a result. The operation will be described below with reference to FIG. 7.

FIG. 7 is a view illustrating a state in which a voltage value of a resonance module 112 is converged to a voltage value of a battery cell 111.

Referring to FIG. 7, it is noticed that when the collecting mode and the discharging module are repeated in the resonance module 112, the voltage value VCs of the resonance module 112 is converged to show the same aspect as the voltage value of the battery cell 111. This means that a resonance current does not normally flow, so that the battery cell balancing is not satisfactorily maintained.

Therefore, when the capacitor of the resonance module 112 is in the releasing mode and a predetermined amount or more of remaining charges remain in the capacitor so that a positive voltage is present, the change-over switch 113a according to the present invention is controlled by the control unit 120 which will be described below, to be turned on. Accordingly, an LC resonance circuit is formed, so that a voltage polarity of the capacitor is changed from positive (+) to negative (−). When the capacitor is charged in this state, a voltage value of the capacitor is prevented from being converged to the voltage value of the battery cell 111.

In the meantime, an operation of the change-over switch 113a will be described in more detail with reference to FIGS. 15 to 21 below.

Next, the control unit 120 includes a voltage measuring unit 121, a peak detecting unit 122, a central control unit 123, and a switch signal generating unit 124.

First, the voltage measuring unit 121 measures voltages of one or more battery cells 111 and transmits the measuring result to the central control unit 123 which will be described below.

The peak detecting unit 122 detects a resonance period from a peak of a voltage waveform of a resonance capacitor Cs included in the resonance module 112 and inputs the detected resonance period to the central control unit 123, which will be described with reference to FIGS. 8 and 9.

FIGS. 8 and 9 are views illustrating a method of measuring a resonance period of a resonance module 112 in a control unit 120 according to an exemplary embodiment of the present invention.

Referring to FIGS. 8 and 9, when an arbitrary switch SW among the plurality of switches is turned on to resonate one or more battery cells 111 and the resonance module 112 with each other, a voltage waveform $V_{Cs}$ of the resonance capacitor Cs and a current waveform $I_{Ls}$ of the resonance inductor Ls can be watched. The peak detecting unit 122 measures a time tpeak1, tpeak2, or tpeak3 at which a peak of the voltage waveform $V_{Cs}$ of the resonance capacitor Cs is generated to measure a resonance period T and the measurement is repeated to reduce a measuring error.

Therefore, even though values of the Cs and the Ls of the resonance module 112 vary depending on changes such as the process deviation or temperature change of one or more battery cells 111, the zero voltage switching operation may be performed without causing any problem through the repeated measurement.

The central control unit 123 periodically receives a voltage measuring result and a resonance period detecting result from the voltage measuring unit 121 and the peak detecting unit 122 and then determines whether the battery cell 111 is a source cell or a sink cell and transmits the determining result to the switch signal generating unit 124 which will be described below.

The switch signal generating unit 124 outputs a control signal which controls each switch of the switch unit 113 to the drive unit 110 in accordance with a resonance period of the resonance module 112, based on the determining result transmitted from the central control unit 123.

The processes will be described below in order.

First, when the voltage measuring unit 121 measures a voltage of the battery cell 111 and continuously transmits the measuring result to the central control unit 123, the central control unit 123 determines whether the battery cell 111 is a source module or a sink module based on the measuring result.

Next, the peak detecting unit 122 connects an arbitrary battery cell 111 to the resonance module 112 through the switch signal generating unit 124 to resonate the battery cell 111 and the resonance module 112 with each other to detect a peak of the Cs voltage of the resonance module 112, measures the resonance period, and transmits the measured resonance period to the central control unit 123.

Next, the central control unit 123 transmits a measured resonance period result to the switch signal generating unit 124 together with a result of determining whether the battery cell 111 is a source module or a sink module and the switch signal generating unit 124 generates a control signal to control the switch unit 113 of the drive unit 110 and transmits the control signal to the drive unit 110, based on received information to perform a charge equalizing process.

In one exemplary embodiment, the control unit 120 performs a zero current switching operation which controls an on/off operation of the switch unit 113 at a time corresponding to half a period of the resonance period of the resonance module 112 to minimize heat generated at the time of switching operation of the switch unit 113, thereby reducing heat generated in the switching element and maximizing a lifespan thereof.

Next, an operation of a dual charge transferring mode among charge transferring methods of a battery cell balancing system 100 using LC resonance according to an exemplary embodiment of the present invention will be described with reference to FIGS. 10 to 14 and an operation of a single charge transferring mode of the battery cell balancing system 100 using LC resonance according to an exemplary embodiment of the present invention will be described with reference to FIGS. 15 to 21.

The control unit 120 of the cell balancing system 100 using LC resonance according to an exemplary embodiment of the present invention transfers charges charged in the resonance module 112 to the battery cells 111 based on the single charge transferring mode and the dual charge transferring mode.

FIG. 10 is a view schematically illustrating a positive collecting step of a dual charge transferring mode among charge transferring methods of a battery cell balancing system 100 using LC resonance according to an exemplary embodiment of the present invention, FIG. 11 is a view schematically illustrating a positive releasing step of a dual charge transferring mode among charge transferring methods of a battery cell balancing system 100 using LC resonance according to an exemplary embodiment of the present invention, FIG. 12 is a view schematically illustrating a negative collecting step of a dual charge transferring mode among charge transferring methods of a battery cell balancing system 100 using LC resonance according to an exemplary embodiment of the present invention, FIG. 13 is a view schematically illustrating a negative releasing step of a dual charge transferring mode among charge transferring methods of a battery cell balancing system 100 using LC resonance according to an exemplary embodiment of the present invention, FIG. 14 is a view schematically illustrating an operating waveform of a resonance module 112 according to an exemplary embodiment of the present invention, FIGS. 15 to 17 are views explaining a single charge transferring mode among charge transferring methods of a battery cell balancing system 100 using LC resonance according to an exemplary embodiment of the present invention, FIG. 18 is a view schematically illustrating an operating waveform in which a resonance module 112 according to an exemplary embodiment of the present invention operates in the single charge transferring mode illustrated in FIGS. 15 to 17, FIGS. 19 to 21 are views explaining a single charge transferring mode of a battery cell balancing system 100 using LC resonance according to another exemplary embodiment of the present invention, and FIG. 22 is a view schematically illustrating an operating waveform in which a resonance module 112 according to an exemplary embodiment of the present invention operates in the single charge transferring mode illustrated in FIGS. 19 to 21.

First, referring to FIGS. 10 to 13, FIG. 10 illustrates a switching state in which charges are transferred from a battery $B_4$ to a battery $B_2$ and from a battery $B_3$ to a battery $B_1$.

Referring to FIG. 10, in a positive collecting (t0 to t1) step which is a first step, a switch $SW_4$ and a switch $SW_5$ are turned on to connect the battery $B_4$ to the inductor Ls and the capacitor Cs of the resonance module and in this case, the current flows from the battery $B_4$ to the resonance module, the capacitor Cs is charged in a positive (+) direction. In this case, voltages of two batteries $B_4$ may be charged.

Referring to FIG. 11, in a positive releasing (t1 to t2) step which is a second step, a switch $SW_2$ and a switch $SW_3$ are turned on to connect the battery $B_2$ to the inductor Ls and the capacitor Cs of the resonance module and in this case, the current flows from the capacitor Cs to the battery $B_2$ and in this case, a current of the capacitor Cs is discharged to be close to zero.

Referring to FIG. 12, in a negative collecting (t2 to t3) step which is a third step, the switch $SW_3$ and the switch $SW_4$ are turned on to connect the battery $B_3$ to the inductor Ls and the capacitor Cs of the resonance module and in this case, the current flows from the battery $B_3$ to the resonance module, the capacitor Cs is charged in a negative (−) direction.

Referring to FIG. 13, in a negative releasing (t3 to t4) step which is a fourth step, the switch $SW_1$ and the switch $SW_2$ are turned on to connect the battery $B_1$ to the inductor Ls and the capacitor Cs of the resonance module and in this case, the current flows in a direction from the capacitor Cs to the battery $B_1$ and thus the capacitor Cs is discharged.

Through the dual charge transferring mode having the above four steps, the battery cell balancing system 100 using LC resonance according to the exemplary embodiment of the present invention repeatedly performs the steps until the charge values between battery cells are balanced. Specifically, in the dual charge transferring mode, the charges are transferred from two battery cells 111 (one odd-numbered battery cell and one even-numbered battery cell) to other two battery cells 111 (one odd-numbered battery cell and one even-numbered battery cell).

Further, in this case, it should be noted that a maintaining time of each step is adjusted to half a period of the resonance module and the charging is repeated once in a positive (+) direction and once in a negative (−) direction to keep the balance of the voltage of the capacitor Cs.

Referring to FIG. 14, in the positive collecting step, the capacitor voltage $V_{Cs}$ of the resonance module 112 increases in a positive direction and in the positive releasing step, drops in a negative direction.

In contrast, in the negative collecting step, the voltage drops in the negative direction and in the negative releasing step, the voltage increases in the positive direction.

Further, in the positive collecting step, an inductor current $I_{Ls}$ increases in the positive direction starting from t0 and drops in the negative direction at t1 again, and in the positive releasing step, the inductor current drops in the negative direction and then increases in the positive direction again.

In contrast, the inductor current in the negative collecting step shows the same aspect as in the positive releasing step and the inductor current in the negative releasing step shows the same aspect as in the positive collecting step.

Referring to FIGS. 15 to 17, FIGS. 15 to 17 illustrate a process for transferring a charge of the battery B2 to the battery B4.

First, referring to FIG. 15, the switches SW2 and SW3 are turned on and all the remaining switches are turned off to charge the capacitor Cs of the resonance module 112 using the charge of the battery B2.

Next, referring to FIG. 16, the switches SW1 to SW3 are turned off and the remaining switches are turned on to transfer charges charged in the capacitor to the battery B4, thereby discharging the capacitor.

Referring to FIG. 17, the capacitor is not completely discharged due to resistance and the remaining charges remain therein. In order to prevent the voltage value of the capacitor from being converged to the voltage value of the battery cell 111 due to the remaining charges, the change-over switch 113a operates to form an LC resonance circuit and a voltage polarity of the capacitor is inversed thereby. As a result, the voltage value of the capacitor is prevented from being converged to the voltage value of the battery cell 111.

Referring to FIG. 18, in the collecting step, the capacitor voltage $V_{Cs}$ of the resonance module 112 increases in a positive direction and in the releasing step, drops in a negative direction.

Further, it is understood that in an inversion step, a capacitor voltage is inverted from a positive value to a negative value and in this case, the inductor current $I_{Ls}$ drops from zero in the negative direction and then is inverted to zero, again.

As a result, it is understood that battery cell balancing between the resonance module 112 and the battery cell 111 is maintained by the operation of the change-over switch 113a while the capacitor voltage value is not converged to the voltage value of the battery cell 111.

Referring to FIGS. 19 to 21, FIGS. 19 to 21 illustrate a process for transferring a charge of the battery B4 to the battery B1.

First, referring to FIG. 19, the switches SW4 and SW5 are turned on and all the remaining switches are turned off to charge the capacitor of the resonance module 112 using the charge of the battery B4.

Next, referring to FIG. 20, since the capacitor is not charged in the positive direction but charged in the negative direction, the change-over switch 113a operates to form the LC resonance circuit, thereby inverting the polarity of the voltage of the capacitor.

Next, referring to FIG. 21, the switches SW1 and SW2 are turned on again, so that the charge charged in the capacitor by the voltage which is inverted by the change-over switch 113a is transferred to the battery B1.

Referring to FIG. 22, it is understood that in the collecting step, the capacitor voltage $V_{Cs}$ of the resonance module 112 increases in the positive direction, in the inversion step, the capacitor voltage is inverted from the positive value to the negative value and in this case, the inductor current $I_{Ls}$ drops from zero in the negative direction and then is inverted to zero. Further, it is understood that in the releasing step, the capacitor voltage increases again and the inductor current in this case increases from zero in the positive direction and then is inverted to zero again.

As a result, it is understood that battery cell balancing between the resonance module 112 and the battery cell 111 is maintained by the operation of the change-over switch 113a while the capacitor voltage value is not converged to the voltage value of the battery cell 111.

While the invention has been described with reference to the preferred embodiments, it will be understood by those skilled in the art that various changes and modifications may be made without departing from the spirit and scope of the invention as defined in the following claims.

The invention claimed is:

1. A battery cell balancing system using LC resonance, the system comprising:
   a drive unit including one or more battery cells which are connected in series, a resonance module which performs a resonance operation, and a switch unit which transfers charges stored in the resonance module to the one or more battery cells; and
   a control unit which measures a resonance period of the resonance module in accordance with a voltage state of each of the one or more battery cells, and controls the switch unit to be turned on or off in accordance with the measured resonance period to transfer the charges charged in the resonance module to the one or more battery cells.

2. The system of claim 1, wherein the switch unit includes:
   a first switch including one or more switches which are connected between each terminal of the one or more battery cells and a first common node;
   a second switch including one or more switches which are connected between each terminal of the one or more battery cells and a second common node; and
   a change-over switch which is connected between the first and second common nodes.

3. The system of claim 2, wherein the first switch, the second switch, and the change-over switch are configured by single pole single throw (SPST) switches.

4. The system of claim 2, wherein each of the first switch, the second switch, and the change-over switch is configured by a pair of MOSFETs (metal oxide semiconductor field effect transistors).

5. The system of claim 2, wherein when a remaining charge remains in a capacitor in the resonance module in a state in which the capacitor in the resonance module is in a releasing mode, the control unit turns on the change-over switch to form an LC resonance circuit and invert a voltage polarity of the resonance module.

6. The system of claim 1, wherein the control unit performs a zero current switching operation which controls an on/off operation of the switch unit at a time corresponding to half a period of the resonance module.

7. The system of claim 2, wherein the first switch which is located at the last end of the first common node and the change-over switch are applied with a driving voltage generated by a separate boot strap circuit, and the remaining switches other than the first switch located at the last end of the first common node and the change-over switch are applied with driving voltages from adjacent battery cells.

8. The system of claim 1, wherein the control unit includes:
a voltage measuring unit which measures a voltage of the one or more battery cells;
a peak detecting unit which detects a resonance period from a voltage waveform peak of a resonance capacitor which is included in the resonance module;
a central control unit which receives a voltage measuring result and a resonance period detecting result from the voltage measuring unit and the peak detecting unit and then determines whether to be a source cell or a sink cell; and
a switch signal generating unit which generates a signal to turn on or off the switch unit in accordance with the determining result and outputs the signal to the drive unit.

9. The system of claim 2, wherein the control unit transfers the charges charged in the resonance module to the one or more battery cells based on a dual charge transferring mode in which the charges are transferred from one pair of battery cells to another pair of battery cells and a single charge transferring mode in which the charges are transferred from one battery cell to another battery cell.

10. The system of claim 9, wherein in the dual charge transferring mode, the control unit connects a first source cell and the resonance module to charge the resonance module in a positive direction and connects the resonance module and a first sink cell to discharge the resonance module in a positive direction, and the control unit connects a second source cell and the resonance module to charge the resonance module in a negative direction and connects the resonance module and a second sink cell to discharge the resonance module in a positive direction, thereby preventing a voltage value of the resonance module from being converged to a voltage value of the battery cell.

11. The system of claim 9, wherein in the single charge transferring mode, the control unit connects a first source cell and the resonance module to charge the resonance module and connects the resonance module and a first sink cell to discharge the resonance module and then turns on the change-over switch to invert a voltage polarity of the resonance module, or the control unit connects a first source cell and the resonance module to charge the resonance module and turns on the change-over switch to invert a voltage polarity of the resonance module and then connects the resonance module and a first sink cell to discharge the resonance module.

12. A battery cell balancing method using LC resonance, the method comprising:
connecting one or more battery cells in series and connecting a resonance module which performs a resonance operation and a switch unit;
measuring a voltage state of each of the connected one or more battery cells and measuring a resonance period of the resonance module in accordance with the voltage state; and
controlling an on/off operation of the connected switch unit to transfer charges charged in the resonance module to each of the one or more battery cells.

13. The method of claim 12, wherein the connecting includes:
connecting one or more first switches between each terminal of the one or more battery cells and a first common node;
connecting one or more second switch units between each terminal of the one or more battery cells and a second common node; and
connecting a change-over switch between the first and second common nodes.

14. The method of claim 12, wherein the switch unit includes a first switch, a second switch and a change-over switch, and
wherein the connecting includes configuring each of the first switch, the second switch, and the change-over switch by a pair of MOSFETs (metal oxide semiconductor field effect transistors).

15. The method of claim 12, wherein the transferring includes turning on the change-over switch to form an LC resonance circuit and invert a voltage polarity of the resonance module when a remaining charge in a capacitor in the resonance module remains when the capacitor in the resonance module is in a releasing mode.

16. The method of claim 12, wherein the transferring includes performing a zero current switching operation which controls an on/off operation of the switch unit at a time corresponding to half a period of the resonance module.

17. The method of claim 13, wherein the connecting includes:
connecting the first switch which is located at the last end of the first common node and the change-over switch to a separate boot strap circuit to be applied with a driving voltage generated by the separate boot strap circuit, and
connecting the remaining switches other than the first switch located at the last end of the first common node and the change-over switch to adjacent battery cells to be applied with driving voltages from the adjacent battery cells.

18. The method of claim 12, wherein the transferring includes:
measuring a voltage of the one or more battery cells;
detecting a resonance period from a voltage waveform peak of a capacitor which is included in the resonance module;
determining whether to be a source module or a sink module after receiving a voltage measuring result and a resonance period detecting result from the voltage measuring unit and the peak detecting unit; and
generating a signal to turn on or off the switch unit in accordance with the determining result and outputting the signal to the drive unit.

19. The method of claim 13, wherein the transferring includes:
transferring the charges charged in the resonance module to the one or more battery cells based on a dual charge transferring mode in which the charges are transferred from one pair of battery cells to another pair of battery cells and a single charge transferring mode in which the charges are transferred from one battery cell to another battery cell.

20. The method of claim 19, wherein the transferring further includes:
    allowing the control unit to connect a first source cell and the resonance module to charge the resonance module in a positive direction and connect the resonance module and a first sink cell to discharge the resonance module in a positive direction, and
    allowing the control unit to connect a second source cell and the resonance module to charge the resonance module in a negative direction and connect the resonance module and a second sink cell to discharge the resonance module in a positive direction, thereby preventing a voltage value of the resonance module from being converged to a voltage value of the battery cell.

* * * * *